Patented Oct. 12, 1937

2,095,638

UNITED STATES PATENT OFFICE 2,095,638

FOOD PRODUCTS AND METHOD OF MANUFACTURE

George A. Jeffreys, Calcium, N. Y.

No Drawing. Application December 22, 1934,
Serial No. 758,858

9 Claims. (Cl. 99—9)

This invention relates to improved food products and to methods of manufacturing the same so as to include in them certain beneficial natural and physical properties. It is concerned principally with the manufacture of animal foods, and the provision of a method whereby such foods may be produced to include the essential elements of a balanced diet, while at the same time possessing physical properties which facilitate the selection of the constituents of the food, and the forming of the same into desirable composite products and into special shapes for convenient use.

Most foods are a mixture of ingredients lacking in enzymes, beneficial and protective organisms, and their beneficial end products. Those which are molded or shaped into forms desirable for animal consumption are usually subjected to high pressures or high temperatures that are destructive to enzymes and vitamins. Where binders have been used to facilitate molding, they usually have consisted of plain syrups or molasses, or other ingredients lacking in beneficial properties.

An important object of the present invention is to produce a liquid base for a food product of such physical character that it will impart cohesiveness to any food when mixed in proper proportions therewith, and which at the same time constitutes a carrier for various beneficial food constituents such as enzymes, vitamins, especially vitamin B, beneficial organisms, lactic acid and the like.

Another object is to produce a base or binder which acts not only as a conveyor of the aforementioned beneficial constituents, but by its own inherent nature preserves and stabilizes these constituents and extends their action to the food with which the base or binder is mixed.

A still further object of my invention is to provide a liquid base or binder containing beneficial and protective organisms or constituents, and possessing adhesive qualities such as enable it to be mixed with a solid food to form a plastic mass which can be molded or formed into any desired shape by the use of suitable machinery that will not destroy the beneficial constituents due to excessive heat or high pressure. Constituents of the binder act both to render it adhesive and to preserve beneficial properties of the food. Thus it is an object of this invention to promote the development of invert sugars which besides possessing adhesive qualities tend to preserve beneficial organisms in the food. Also the presence of lactic acid in the binder imparts an inhibiting influence to the entire food product, which curtails the growth of putrefactive bacteria.

Still another object of the present invention is to provide a carrier for beneficial food constituents in which the quantity and nature of the constituents may be varied in accordance with the desired properties of the final food product, and which also is capable of combination with a wide variety of solid food materials to form products which include all of the essentials of a balanced diet.

An additional object of my invention is to provide a method for the manufacture of a base or binder containing beneficial and protective constituents by a series of fermentations in which the starting material is subjected to a sterilization treatment prior to such fermentations in order that the effects of the latter may be controlled.

In its broader aspects my invention consists in the preparation of a liquid base possessing adhesive properties and containing beneficial food constituents such as vitamins, enzymes and protective organisms in concentrated form by a succession of treatments of a water suspension containing principally starchy substances and sugars. The treatments include cooking a starch suspension to render it sterile and to gelatinize the starch, effecting conversion of the starch to sugar by the action of a diastatic enzyme, fermenting with yeast rich in vitamin B, and fermenting with lactic bacillae to form a small percentage of lactic acid. The product in liquid form possesses excellent adhesive properties, and is combined with any desired meal to form a mass which may be used in the form of an impregnated meal or molded into shapes suitable for animal consumption. The binder or base makes the food rich in vitamin B, enzymes, and other constituents which promote digestion, are beneficial to animals, and tend to preserve the food.

In the carrying out of a specific embodiment of my invention, I prepare the liquid base or binder by means of the following or equivalent steps. A wooden vat, or other noncorrosive receptacle of suitable size is utilized. Into such a vat containing a measured quantity of cold water is mixed a quantity of finely ground raw cereal equivalent to about 15 to 25 percent. of the weight of the water. Cereals such as whole wheat, rye, barley, red dog, or other similar cereals or starches which provide a good substrate for enzymes, yeast and lactic acid organisms may be employed. In addition, the following approximate amounts of materials are added to this mixture, the percentages indicating the relation of the weight of such materials to the amount of water employed at the outset: 5 percent. to 10 percent. powdered milk, 5 percent. molasses, and 20 percent. sugar and 1 percent. sodium chloride.

The materials contained in the vat are mixed thoroughly and boiled until the starch is gelatinized. Thus a homogeneous suspension in water is formed, and the mixture is rendered sterile, so that a high degree of control over succeeding operations is possible. After the suspension has been formed, the mixture is cooled quickly to about 95° F., and then inoculated with enzymes and yeast rich in vitamin B. Commercial diastase is a suitable enzyme material which is added to increase and hasten the conversion of starch to maltose and glucose.

Fermentation of said mixture is allowed to proceed from eight to twelve hours or longer, in which time the yeasts will have multiplied, thereby stepping up the vitamin B content. Sucrose also is gradually inverted to glucose by invertase of the yeast which is desirable since glucose makes an excellent binder and is more easily digested. Other starches have been split to maltose which is also a good binder and easily digested. If desired, yeast can now be inactivated by pasteurizing at 130 degrees F. for fifteen minutes without destroying the vitamins. For most foods, pasteurization of yeast is not necessary.

To the mixture is now added sufficient molasses, approximately about 10% of the whole, or other syrups or sugars to make a rich media for the culturing of lactic organisms. The mixture is then inoculated with a concentrated culture of lactic bacilli, particularly acidophilus, or similar organisms whose end products are mostly lactic acid without formation of gas.

Culturing is allowed to proceed from twelve to sixteen hours, when the reaction will have reached about .5% lactic acid. The entire mixture by this time changes from a paste to a syrupy liquid rich in enzymes, vitamins, and digestible sugars having cohesive properties and protected from decomposition by beneficial, protective organisms and their end products.

This prepared base is now ready to be incorporated into the body of any meal food. This is usually done with a high speed mixer. The percentage of this base to use may vary according to the character of the food, temperature and humidity conditions and amount of cohesiveness desired, 15 percent, for example, being a suitable proportion under certain conditions.

The effect of adding the binder renders it plastic and it can easily be formed by special machines into desired shapes, such as kernels, granules, pellets, and cakes or it may be used in the form of an impregnated meal without the special molding operations.

Part of any excess moisture may now be removed by running the food through low temperature dryers. Absolute dryness is not necessary nor desirable since the properties of the sugars tend to preserve the food and are themselves conveyors of enzymes, vitamins, beneficial organisms, and end products so necessary for a natural food and easy digestion.

During the drying process, enzymic and other biologic actions have a tendency to continue and be extended throughout the entire food. Thus, the starches added are further hydrolized to digestible sugars.

While a specific embodiment of the invention has been disclosed above, it is to be understood that applicant is not limited to the exact practice followed in that embodiment, but that various changes in the succession of steps, the material employed, and the conditions of treatment may be resorted to without departing from the spirit of the invention. For example, it should be clear to anyone skilled in the art that the fermentation with a diastatic enzyme might be carried out independently of the yeast fermentation, as well as that the temperatures of treatment might be varied to produce equivalent results. The invention is to be construed broadly, and to be accorded a scope commensurate with the scope of the appended claims.

I claim as my invention:—

1. A binder for a food product consisting of a syrupy liquid containing substantial quantities of vitamin B, enzymes, lactic acid and invert sugars, in which the invert sugar acts as a preservative for constituents such as vitamin B and enzymes and the lactic acid inhibits the development of putrefactive bacteria, said liquid being of a syrupy consistency and possessing adhesive properties.

2. A method of making an adhesive liquid base for a food product containing substantial quantities of vitamin B, lactic acid, and beneficial enzymes, which comprises forming a mixture in water of a cereal starch, powdered milk and sugars, gelatinizing the starch to form a suspension, cooling the mixture, fermenting with a diastatic enzyme and a yeast rich in vitamin B, whereby the yeast content is increased, sucrose is converted to glucose, and the starch is split to form maltose, enriching the mixture with a sugar, and fermenting with lactic bacilli until a small proportion of lactic acid has formed, and the mixture becomes adhesive and has assumed the consistency of a syrup.

3. In the manufacture of a liquid base for a food product, containing vitamin B, invert sugars and beneficial enzymes, wherein a mixture of cereal starch and sugars is fermented with diastase, yeast rich in vitamin B, and lactic bacilli, the steps which consist in gelatinizing a mixture including such starch and sugar in water at a temperature which renders the mixture sterile, and thereafter subjecting said mixture to controlled fermentation to increase the vitamin B content, convert starch into maltose, and sucrose into glucose and develop lactic acid and to produce an adhesive liquid having the consistency of a syrup.

4. The method of making a base for a food product containing substantial quantities of vitamin B, lactic acid and beneficial enzymes, which comprises forming a mixture containing approximately 15 to 25 per cent of a cereal starch, more than 5 per cent powdered milk, about 5 per cent molasses, about 20 per cent sucrose, a small quantity of sodium chloride, and the balance water, boiling said mixture until the starch is gelatinized, whereby the mixture is rendered sterile, cooling the mixture, adding thereto a quantity of diastase and a concentrated culture of yeast rich in vitamin B, allowing the mixture to ferment for a period from 8 to 12 hours, adding a quantity of sugar-bearing substance to enrich the mixture, inoculating with concentrated lactic bacilli, and fermenting for an additional period of from 12 to 16 hours whereby a small percentage of lactic acid is produced, and the mixture assumes the consistency of an adhesive syrup.

5. The method as defined in claim 4, wherein, after the fermentations with yeast and diastase, the mixture is pasteurized at a temperature of the order of 130° F. to inactivate the yeast.

6. In the manufacture of a base for a food product, containing beneficial organisms, invert sugars and lactic acid, converting starch contained in a starting material to maltose and sugars to glucose by fermentations, respectively, with a diastatic enzyme and yeast, and developing a small percentage of lactic acid in the mixture of conversion products, thereby imparting to the mixture the consistency of an adhesive syrup.

7. A composite food product comprising solid food in the form of a meal intimately mixed with and maintained in a cohesive, shape retaining mass by a syrupy liquid binder containing substantial quantities of vitamin B, enzymes, lactic acid and invert sugar, said product embodying beneficial food constituents imparted thereto by said binder and being preserved and made more resistant to oxidation and the development of putrefactive bacteria by said binder.

8. The method of making a liquid binder for a food product containing substantial quantities of vitamin B, lactic acid and beneficial enzymes which comprises forming a mixture in water including cereal starch and powdered milk, boiling the mixture until the starch is gelatinized, cooling the mixture, fermenting with diastase to convert starch into maltose, inoculating with yeast rich in vitamin B and fermenting to increase the content thereof, inoculating the mixture with lactic bacilli and developing lactic acid therein by culturing said lactic bacilli until the mixture has assumed the consistency of an adhesive syrup.

9. A composite food product comprising solid food in the form of a meal intimately mixed and impregnated with a syrupy liquid base containing substantial quantities of vitamin B, enzymes, lactic acid and invert sugar, said product embodying beneficial food constituents imparted thereto by said base and being preserved and made more resistant to oxidation and the development of putrefactive bacteria by said base.

GEORGE A. JEFFREYS.